United States Patent [19]

Conway

[11] 3,935,127

[45] Jan. 27, 1976

[54] METHOD OF CATALYST MANUFACTURE
[75] Inventor: John E. Conway, La Grange, Ill.
[73] Assignee: Universal Oil Products Company, Des Plaines, Ill.
[22] Filed: July 1, 1974
[21] Appl. No.: 484,519

[52] U.S. Cl. ................. 252/465; 252/470; 208/216
[51] Int. Cl.² ........................................... B01J 23/16
[58] Field of Search ............................ 252/465, 470

[56] References Cited
UNITED STATES PATENTS
2,993,868   7/1961   McEvoy .......................... 252/465
3,020,244   2/1962   Dienes .............................. 252/465

Primary Examiner—W. J. Shine
Attorney, Agent, or Firm—James R. Hoatson, Jr.; Robert W. Welch; William H. Page, II

[57] ABSTRACT

A catalytic composite of from about 4 to about 30 wt. % Group VIB metal, from about 1 to about 10 wt. % Group VIII metal and a refractory inorganic oxide carrier material is manufactured by co-extruding a Group VIB metal compound, a Group VIII metal compound and a refractory inorganic oxide, the resulting extrudate being subsequently impregnated with a Group VIB metal compound and a Group VIII metal compound to yield an improved catalyst.

9 Claims, No Drawings

METHOD OF CATALYST MANUFACTURE

This invention relates to the hydrodesulfurization of petroluem hydrocarbon fractions such as residual fuel oils, and to a method for the manufacture of a catalytic composite particularly adapted thereto. It has become well known that oxides of sulfur, plus lesser amounts of other sulfurous compounds, are among the major pollutants of the atmosphere. It has been estimated that, in this country alone, in excess of about 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuel oils of suitably low sulfur content is entirely inadequate for the present day requirements and it becomes increasingly important to develop improved desulfurization techniques to treat the more accessible and abundant residual fuel oils of relatively high sulfur content.

Desulfurization technology is presently concerned with hydrotreating and to the development of catalysts that are more selective and/or operate at less severe conditions to obviate hydrocracking of the residual fuel oil. Hydrotreating, or hydrodesulfurization, is generally effected at hydrodesulfurization reaction conditions including an imposed hydrogen pressure of from about 100 to about 3000 psi. Normally, the hydrogen is charged together with recycle hydrogen to provide from about 1000 to about 50,000 standard cubic feet per barrel of hydrocarbon charge. Hydrodesulfurization reaction conditions further include an elevated temperature, usually from about 200° to about 800° F. although temperatures in the higher range, say from about 600° to about 800° F., are most suitable. Also, a sulfur-containing feed stock is generally suitably processed at a liquid hourly space velocity of from about 0.5 to about 20. Hydrodesulfurization catalysts preferably comprise a Group VIB metal, usually molybdenum, and a Group VIII metal, usually nickel or cobalt, on a refractory inorganic oxide carrier material, usually alumina.

It is an object of this invention to present a novel method for the manufacture of a catalytic composite of a Group VIB metal, a Group VIII metal and a refractory inorganic oxide carrier material, the method being particularly applicable to the manufacture of an improved hydrorefining catalyst.

In one of its broad aspects, the present invention embodies a method of manufacturing a catalytic composite of from about 4 to about 30 wt. % Group VIB metal, from about 1 to about 10 wt. % Group VIII metal and a refractory inorganic oxide carrier material which comprises dry mixing a finely divided Group VIB metal compound, Group VIII metal compound and a refractory inorganic oxide, said metal compounds being utilized in an amount to provide from about 60 to about 90% of the Group VIB metal component of the final catalytic composite, and from about 60 to about 90% of the Group VIII metal component; peptizing the mixture and forming an extrudable dough; extruding said dough, and drying and calcining the extrudate; impregnating the calcined extrudate with a Group VIB metal compound and a Group VIII metal compound, said metal compound being utilized in an amount to provide a final catalytic composite containing from about 4 to about 30 wt. % Group VIB metal and from about 1 to about 10 wt. % Group VIII metal; and drying and calcining the resulting composite in an oxidizing atmosphere. The aforesaid metal compounds are thermally decomposable to metal oxides by the calcination treatment and the final catalyst hence contains the metals in oxide form.

One of the more specific embodiments of the present invention relates to a method of manufacturing a catalytic composite of from about 4 to about 30 wt. % molybdenum, from about 1 to about 10 wt. % cobalt and alpha-alumina monohydrate, which comprises dry mixing finely divided molybdic anhydride, cobalt carbonate and alpha-alumina monohydrate, said molybdic anhydride and said cobalt carbonate being utilized in an amount to provide from about 60 to about 90% of the molybdenum component and from about 60 to about 90% of the cobalt component; peptizing the mixture with dilute nitric acid and forming an extrudable dough; extruding said dough, and drying and calcining the extrudate at a temperature of from about 600° to about 1200° F.; impregnating the calcined extrudate with a common ammoniacal solution of molybdic acid and cobalt nitrate, said molybdic acid and said cobalt nitrate being utilized in an amount to provide a final catalytic composite containing from about 4 to about 30 wt. % molybdenum and from about 1 to about 10 wt. % cobalt; drying and calcining the resulting composite in air at a temperature of from about 600° to about 1200° F.

Other objects and embodiments of this invention will become apparent in the following detailed specification.

In accordance with the method of this invention, a finely divided Group VIB metal compound, Group VIII metal compound and a refractory inorganic oxide are dry mixed, the mixture being subsequently peptized to form an extrudable dough. The expression "finely divided" is descriptive of particles having an average diameter of less than about 150 microns, for example, particles which are recoverable through a 105 micron microsieve. The refractory inorganic oxide can be alumina, silica, zirconia, thoria, boria, chromia, magnesia, titania, and the like, or composites thereof such as alumina-silica, alumina-zirconia, and the like. Alumina is a preferred refractory inorganic oxide, especially alpha-alumina monohydrate of the boehmite structure, and the further description of the method of this invention is presented with respect thereto. The dry mixing operation is improved utilizing an alpha-alumina monohydrate characterized by a weight loss on ignition at 900° C. of from about 20 to about 30 wt. %. In addition to its contribution to the catalytic properties of the catalytic composite of this invention, the alpha-alumina monohydrate improves the extrusion characteristics of the mixture whereby the mixture is readily extruded through a 1/32 – 1/8 inch orifice at a pressure of less than about 500 psig.

Molybdic anhydride is a particularly suitable Group VIB metal compound, and cobalt carbonate is a particularly suitable Group VIII metal compound for dry mixing with the alpha-alumina monohydrate as herein contemplated. Other suitable Group VIB metal compounds, that is, compounds of molybdenum, tungsten and chromium, include molybdic acid, ammonium molybdate, ammonium chromate, chromium acetate, chromous chloride, chromium nitrate, tungstic acid, etc. Other Group VIII metal compounds which may be employed, that is, compounds of iron, nickel, cobalt, platinum, palladium, ruthenium, rhodium, osmium and iridium, include nickel initrate, nickel sulfate nickel chloride, nickel acetate, coblatous sulfate, ferric nitrate, ferric sulfate, platinum chloride, palladium chloride, and the like. In any case, the resulting mixture is peptized, suitably by the addition thereto of a weak acid such as formic acid, acetic acid, propionic acid, and the like, although the stronger acids such as sulfuric acid, hydrochloric acid, and particularly nitric acid are preferred. Sufficient peptizing agent is blended or mulled with the mixture to form an extrudable dough or pliable plastic mass.

The extrusion operation is suitably effected with commercial extrusion apparatus. For example, the dough is continuously processed through a cylinder by means of a rotating screw, and pressured through a perforated plate at one end of the cylinder. The extrudate may be cut into particles of desired length prior to drying and calcining by means of a rotating knife as the extrudate emerges from the perforated plate. Alternatively, the extrudate may be broken into particles of random length during the drying and calcining process. In any case, the exturdate is dried and calcined, drying being usually accomplished at a temperature up to about 25° F. over a 1–24 hour period, and calcining being preferably effected in an oxidizing atmosphere such as air at a temperature of from about 600° to about 1200° F. over a period of from about 2 to about 4 hours.

The catalytic composite of this invention is prepared to contain from about 4 to about 30 wt. % Group VIB metal and from about 1 to about 10 wt. % Group VIII metal. Only a fraction of the total desired metals content of the final catalytic composite is added thereto by the foregoing co-extrusion technique. More particularly, said Group VIB metal compound and said Group VIII metal compound are utilized in an amount to provide from about 60% to about 90% of each of the Group VIB metal component and the Group VIII metal component of the final catalytic composite. The remainder of the desired total metals content is added by impregnating the calcined extrudate with a Group VIB metal compound and a Group VIII metal compound.

It is common practice to deposit catalytically active metallic components on a support or carrier material by the method whereby a soluble compound of the desired metallic component is impregnated on the carrier material from an aqueous solution. The soluble compound serves as a precursor of the metallic component such that, upon subsequent heating of the impregnated carrier material at a temperature effecting decomposition of said compound, the desired metallic component is formed deposited upon the carrier material. The aqueous impregnating solution will thus comprise a soluble precursor compound of a Group VIB metal. Suitable compounds include ammonium molybdate, ammonium paramolybdate, molybdic acid, ammonium chromate, ammonium peroxychromate, chromium acetate, chromous chloride, chromium nitrate, ammonium metatungstate, tungstic acid, etc. The impregnating solution is suitably a common solution of a Group VIB metal compound and a Group VIII metal compound. Suitable soluble compounds of Group VIII metals include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum chloride, chloroplatinic acid, chloropalladic acid, palladium chloride, etc. Of the Group VIB metals, molybdenum is preferred.

Impregnation of the calcined extrudate can be accomplished by conventional techniques whereby the extrudate particles are soaked, dipped, suspended or otherwise immersed in the impregnating solution at conditions to absorb a soluble compound comprising the desired catalytic component. Certain impregnating techniques have been found to be particularly favorable to promote desired physical properties of the finished catalyst. Thus, impregnation of the Group VIB and Group VIII metal components is preferably from a common aqueous ammoniacal solution of soluble compounds thereof, for example, an ammoniacal solution of molybdic acid and cobalt nitrate. Further, the impregnation is preferably effected utilizing a minimal volume of impregnating solution commensurate with an even distribution of the catalytic components on the calcined extrudate particles. One preferred method involves the use of a steam-jacketed rotary dryer. The extrudate particles are immersed in the impregnating solution contained in the dryer and tumbled therein by the rotating motion of the dryer, the volume of extrudate particles so treated being initially in the range of from about 0.7 to about 1.0 with respect to the volume of the impregnating solution. Evaporation of the solution in contact with the extrudate particles is expedited by applying steam to the dryer jacket. The evaporation is further facilitated by a continuous purge of the dryer utilizing a flow of dry gas, suitably air or nitrogen. The impregnated particles, thus dried, are thereafter calcined in an oxygen-containing atmosphere at a temperature of from about 600° to about 1200° F. in accordance with prior art practice, usually for a period of from about 1 to about 8 hours or more.

The following comparative examples, including an example of one preferred embodiment of the present invention, are presented in illustration of the improvment resulting from the method of manufacture of this invention and are not intended as an undue limitation on the generally broad scope of the invention as set out in the appended claims.

EXAMPLE I

About 450 grams of a commercial powdered alpha-alumina monohydrate (Catapal S) was thoroughly dry mixed with 95.6 grams of a finely powdered, volatile free, molybdic oxide and about 19.9 grams of powdered cobalt carbonate. Approximately 245 grams of 13 wt. % nitric acid was then added to the powdered mixture in a muller, the mixture being thereby converted to a dough. The mixture was mulled for about an hour and thereafter extruded through a perforated plate comprising 1/32 inches perforations. The extrudate was dried and calcined in air for about an hour at 750° F. and thereafter for an additional hour at 1100°F. The extruded particles, broken to an average length of about ⅛ inches, contained 2.8 wt. % Co and 8.7 wt. %

Mo.

EXAMPLE II

Pursuant to the present invention, the extrudate particles of Example I were further impregnated with molybdic acid and cobalt nitrate. Thus, about 100 grams of the extrudate particles were impregnated with a common ammoniacal solution of molybdic acid and cobalt nitrate prepared by commingling an aqueous solution of 2.7 grams of 85% molybdic acid and 2.3 milliliters of ammonium hydroxide with an aqueous solution of 1.2 grams of cobalt nitrate hexahydrate and 1.2 milliliters of ammonium hydroxide, the resulting solution being subsequently diluted to about 170 milliliters with water. The extrudate particles were immersed in the impregnating solution which was then evaporated to dryness. The impregnated particles were then calcined in air for about 1 hour at 750° F. and for an additional hour at 1100° F. The extrudate particles contained 3.5 wt. % Co and 10.3 wt. % Mo.

EXAMPLE III

In this example, the cobalt and molybdenum components were incorporated in the catalytic composite solely by impregnation. In this example, 100 grams of the powdered alpha-alumina monohydrate was mulled with about 55 grams of 13 wt. % nitric acid to form a dough. The dough was then extruded, dried, and calcined in air for about an hour at 750° F. and then for an additional hour at 1100° F. The calcined particles were immersed in a common ammoniacal solution of molybdic acid and cobalt nitrate hexahydrate prepared by commingling an aqueous solution of 20.7 grams of 85% molybdic acid and 12 milliliters of ammonium hydroxide with an aqueous solution of 16 grams of cobalt nitrate hexahydrate and 12 milliliters of ammonium hydroxide. Approximately 87 grams of the extrudate particles were immersed in the impregnating solution which was then evaporated to dryness. The impregnated particles were then calcined as heretofore described. The impregnated extrudate particles contained 3.25 wt. % Co and 9.4 wt. % Mo.

A summary of catalyst properties and activity test results is tabulated below.

stripper bottoms collected over an 8-hour period was analyzed for sulfur.

In the described desulfurization of vacuum gas oil, the catalyst of Example II, wherein the cobalt and molybdenum components were incorporated in the catalyst by coextrusion followed by impregnation pursuant to the method of this invention, was 55% more active than the catalyst of Example III, wherein the cobalt and molybdenum components were incorporated solely by impregnation, and 95% more active than the catalyst of Example I, wherein the cobalt and molybdenum components were incorporated solely by coextrusion with the alumina.

I claim as my invention:

1. A method of manufacturing a catalytic composite of from about 4 to about 30 wt. % Group VIB metal in oxide form, from about 1 to about 10 wt. % Group VIII metal in oxide form and a refractory inorganic oxide carrier material which comprises:
   a. dry mixing molybdenum oxide or finely divided Group VIB metal compound thermally decomposable to the metal oxide, Group VIII metal compound thermally decomposable to the metal oxide and a refractory inorganic oxide, said metal compounds being utilized in amounts to provide from about 60 to about 90% of said Group VIB metal in oxide form and from about 60 to about 90% of said Group VIII metal in oxide form;
   b. peptizing the mixture and forming an extrudable dough;
   c. extruding said dough and drying and calcining the extrudate;
   d. impregnating the calcined extrudate with a Group VIB metal compound and a Group VIII metal compound, said metal compounds being thermally decomposable to metal oxides and being utilized in amounts to provide a final catalytic composite containing from about 4 to about 30 wt. % Group VIB metal in oxide form and from about 1 to about 10 wt. % Group VIII metal in oxide form; and
   e. drying and calcining the resulting composite in an oxidizing atmosphere.

2. The method of claim 1 further characterized in that said refractory inorganic oxide is alumina.

| Promoter Addition Technique Catalyst Properties | Coextrusion | Coextrusion & Impregnation | Impregnation |
| --- | --- | --- | --- |
| ABD | 0.685 | 0.733 | 0.697 |
| Piece Density, g/cc | 1.25 | 1.30 | 1.28 |
| Diameter, In. | 0.028 | 0.028 | 0.029 |
| Wt. % Co | 2.8 | 3.5 | 3.25 |
| Wt. % Mo | 8.7 | 10.3 | 9.4 |
| SA, m²/g | 299 | 294 | 272 |
| PV, cc/g | 0.51 | 0.48 | 0.51 |
| PD, A | 68 | 65 | 75 |

The above-described catalysts were evaluated with respect to the desulfurization of a vacuum gas oil boiling in the 600°-1050° F. range and containing 2.6 wt. % sulfur. In each case, the catalyst was disposed as a fixed bed in a vertical tubular reactor maintained at 650 psig and 750° F. The vacuum gas oil was charged over the catalyst at 3.0 liquid hourly space velocity in admixture with 1800 standard cubic feet of hydrogen per barrel of charge. The reactor effluent was separated into a liquid and a gaseous phase in a high pressure separator at 250° F., and the liquid phase was treated in a stripper column for the separation of light ends. The liquid 3. The method of claim 1 further characterized in that said refractory inorganic oxide is alpha-alumina monohydrate.

4. The method of claim 1 further characterized with respect to step (b) in that said mixture is peptized with nitric acid.

5. The method of claim 1 further characterized in that said Group VIB metal is molybdenum.

6. The method of claim 1 further characterized in that molybdic anhydride is used in step (a).

7. The method of claim 1 further characterized in that said Group VIII metal is cobalt.

8. The method of claim 1 further characterized in that said Group VIII metal compound is cobalt carbonate.

9. The method of claim 1 further characterized with respect to step (e) in that said composite is calcined in an oxidizing atmosphere at a temperature of from about 600° to about 1200° F.

* * * * *